United States Patent
Franklin et al.

(10) Patent No.: US 9,198,069 B2
(45) Date of Patent: Nov. 24, 2015

(54) PRIORITY MEASUREMENT RULES FOR CHANNEL MEASUREMENT OCCASIONS

(75) Inventors: Steven Franklin, Guildford (GB); Alexander G. Charles, Fleet (GB)

(73) Assignee: BROADCOM CORPORATION, Irvine, CA (US)

( * ) Notice: Subject to any disclaimer, the term of this patent is extended or adjusted under 35 U.S.C. 154(b) by 757 days.

(21) Appl. No.: 13/023,675

(22) Filed: Feb. 9, 2011

(65) Prior Publication Data
US 2012/0202480 A1    Aug. 9, 2012

(51) Int. Cl.
*H04W 36/00*    (2009.01)
*H04W 24/10*    (2009.01)

(52) U.S. Cl.
CPC .......... *H04W 24/10* (2013.01); *H04W 36/0088* (2013.01)

(58) Field of Classification Search
CPC ..... H04W 36/36; H04W 36/18; H04W 36/08; H04W 36/02; H04W 36/0083; H04W 36/14; H04W 36/12; H04W 48/16; H04W 48/18; H04W 24/10; H04W 24/02; H04W 48/37; H04W 80/04; H04W 24/00; H04W 36/30; H04W 36/0011; H04W 48/20; H04W 84/045; H04W 36/0094; H04W 36/0088; H04W 74/002; H04W 52/40; H04W 36/023; H04W 74/08; H04B 17/0057; H04B 1/7083; H04J 11/0069; H04J 11/0086; H04J 11/0093
USPC ........... 455/435.1, 435.3, 436, 449, 466, 413, 455/450, 453, 414.1, 458, 525, 522, 442, 455/456.2, 501, 456.1, 456.5, 502; 370/331, 332, 333, 254, 231, 252, 328, 370/400; 707/748; 704/10, 1

See application file for complete search history.

(56) References Cited

U.S. PATENT DOCUMENTS

2004/0023634 A1    2/2004    Jeong et al.
2007/0004445 A1    1/2007    Dorsey et al. ................. 455/525

(Continued)

FOREIGN PATENT DOCUMENTS

EP    1467586 A2    10/2004
EP    1594327 A1    11/2005

(Continued)

OTHER PUBLICATIONS

Renesas Mobile Europe Ltd et al, Inter-RAT UMTS to LTE Reselection, published May 3, 2011, 3GPP Draft; R4-112967. 3rd Generation Partnership Project (3GPP), Mobile Competence Centre, 650 route des Lucioles, France.

(Continued)

*Primary Examiner* — Fred Casca
(74) *Attorney, Agent, or Firm* — Oblon, McClelland, Maier & Neustadt, L.L.P.

(57) ABSTRACT

Based on the determined signal strength of a serving cell, a choice is made whether to utilize a cell-FACH measurement occasion for a lower priority neighbor cell search or for a higher priority neighbor cell search. The lower priority search is for maintaining wireless connectivity and the higher priority search is for accessing enhanced wireless service. In specific examples the search may be inter-frequency for frequency layers with higher or lower priority than a serving layer of the serving cell, or the search may be inter-RAT such as the lower priority GERAN search and a higher priority E-UTRAN search if the serving cell is WCDMA. In one example there are two thresholds for the signal strength, and if higher than both then the measurement occasion is used for an E-UTRAN search regardless of whether GERAN or inter-frequency neighbor cells have been configured for the UE.

16 Claims, 7 Drawing Sheets

(56) References Cited

U.S. PATENT DOCUMENTS

| | | |
|---|---|---|
| 2007/0129017 A1 | 6/2007 | Dalsgaard et al. .......... 455/67.11 |
| 2007/0270148 A1 | 11/2007 | Yeh et al. ...................... 455/436 |
| 2008/0268843 A1 | 10/2008 | Ore et al. .................... 455/435.3 |
| 2008/0287127 A1* | 11/2008 | Wu et al. ........................ 455/434 |
| 2009/0047958 A1 | 2/2009 | Rimhagen et al. ............ 455/436 |
| 2009/0088160 A1 | 4/2009 | Pani et al. ...................... 455/436 |
| 2009/0124249 A1 | 5/2009 | Young et al. ................ 455/422.1 |
| 2009/0191883 A1* | 7/2009 | Choi et al. .................... 455/450 |
| 2009/0239535 A1 | 9/2009 | Chun et al. ................. 455/435.2 |
| 2009/0270103 A1* | 10/2009 | Pani et al. ...................... 455/436 |
| 2009/0303891 A1 | 12/2009 | Lucas et al. ................... 370/252 |
| 2010/0255849 A1 | 10/2010 | Ore ................................ 455/450 |
| 2010/0278142 A1 | 11/2010 | Dwyer et al. |
| 2010/0330921 A1 | 12/2010 | Kim et al. |
| 2010/0330981 A1 | 12/2010 | Kazmi |
| 2011/0076958 A1* | 3/2011 | Fukushi ...................... 455/67.11 |
| 2011/0110254 A1* | 5/2011 | Ji et al. .......................... 370/252 |
| 2011/0143738 A1* | 6/2011 | Kone ............................. 455/418 |
| 2011/0235614 A1* | 9/2011 | Lerzer et al. .................. 370/331 |
| 2012/0039189 A1* | 2/2012 | Suzuki et al. ................. 370/252 |
| 2012/0122511 A1* | 5/2012 | Antonio et al. ............... 455/522 |
| 2013/0084858 A1* | 4/2013 | Ramasamy et al. .......... 455/434 |

FOREIGN PATENT DOCUMENTS

| | | |
|---|---|---|
| EP | 1971176 | 9/2008 |
| EP | 2077689 | 7/2009 |
| EP | 2077690 A2 | 7/2009 |
| EP | 2262309 | 12/2010 |
| WO | 9859448 | 12/1998 |
| WO | WO-2008/072912 A1 | 6/2008 |
| WO | 2009097481 | 8/2009 |

OTHER PUBLICATIONS

Renesas Mobile Europe Ltd et al, Reselection from UTRAN Cell_FACH state to EUTRAN, published Apr. 4, 2011, 3GPP Draft; R2-112164. 3rd Generation Partnership Project (3GPP), Mobile Competence Centre, 650 route des Lucioles, France.

"3rd Generation Partnership Project; Technical Specification Group Radio Access Network; Requirements for support of radio resource management (FDD) (Release 10)", 3GPP TS 25.133 V10.0.0, Section4.2.2.5a, Dec. 2010, 15 pgs.

EP Search Report under Section 17 for corresponding GB Patent Application No. 120423.5 mail May 24, 2012.

"3rd Generation Partnership Project; Technical Specification Group Radio Access Network; User Equipment (UE) procedures in idle mode and procedures for cell reselection in connected mode (Release 9)", 3GPP TS 25.304 V9.3.0, Sep. 2010, 50 pgs.

3GPP TSG-RAN WG2 Meeting #74, Barcelona, Renesas Mobile Europe Ltd, TeliaSonera Ericsson, ST-Ericsson: 'Reselection from UTRAN Cell FACH state to EUTRAN 3rd Generation Partnership Project (3GPP), Mobile Competence Centre ; 650, Route Des Lucioles, vol. R2-113383, May 12, 2011' pp. 1-4,XP002691654,Barcelona, Spain,Retrieved from the Internet:URL:http://www.3gpp.orgjftpjtsg_ranjWG2_RL2/TSGR2_74/Docs; Measurements and reselection to high priority layers;p.3, paragraph 2.2—p. 4.

3GPP TSG-RAN WG2 Meeting #60bis; Nokia Corporation et al: "Discussion on various Idle Mode open items", 3GPP Draft; R2-080175 E-UTRA Reselection Considerations_V3, 3rd Generation Partnership Project (3GPP), vol. RAN WG2, No. Sevilla, Spain; Jan. 8, 2008,XP050138054,Measurment rules p. 1, paragraph 2.1; Priority handling p. 2, paragraph 2.3; Measurement Rules p. 3, paragraph 2.4.

3rd Generation Partnership Project;Technical Specification Group Radio Access Network; Evolved Universal Terrestrial Radio Access (E-UTRA); User Equipment (UE) procedures in idle mode (Release 10), 3GPP Standard; 3GPP TS 36.304, 3rd Generation Partnership Project (3GPP), vol. RAN WG2, No. V10.2.0, Jun. 21, 2011, pp. 1-33, XP050553465, Reselection priorities handling p. 18, paragraph 5.2.4.1; Measurement rules for cell re-selection p. 18, paragraph 5.2.4.2—p. 19.

3GPP TSG-RAN WG4 Meeting #46bis, Nokia, Scheduling of LTE Measurement Gaps for Inter-Frequency and Inter-RAT Monitoring, R4-081074 (May 4-9, 2008) (5 pages).

3GPP TSG-RAN WG2 Meeting #75, Renesas, Addition of Measurements and Reselection from UTRAN Cell_FACH to to E-UTRAN, R2114351, (Aug. 22-26, 2011), (11 pages).

3GPP TSG-RAN Meeting #52, Renesas, "WID Update to Further Enhancements to Cell_FACH", RP-110913,(May 31-Jun. 3, 2011) 5 pages.

* cited by examiner

| T_meas (ms) | N_TTI=1 FRAME Tidentify, GSM (ms) | N_TTI=2 FRAMES Tidentify, GSM (ms) | N_TTI=4 FRAMES Tidentify, GSM (ms) | N_TTI=8 FRAMES Tidentify, GSM (ms) |
|---|---|---|---|---|
| 80 | 2880 | 1280 | – | – |
| 160 | 7680 | 2880 | 1280 | 640 |
| 240 | 29760 | 5280 | – | – |
| 320 | 14080 | 6400 | 2560 | 1280 |
| 480 | 34560 | 12480 | 2880 | 1920 |
| 640 | 34560 | 12800 | 5120 | 2560 |
| 960 | * | 24960 | 5760 | 3840 |
| 1280 | * | 20480 | 10240 | 5120 |
| 1920 | * | 34560 | 15360 | 7680 |

NOTE * : THERE ARE NO PERFORMANCE REQUIREMENTS FOR THESE COMBINATIONS OF PARAMETERS BECAUSE THEY RESULT IN LONG IDENTIFICATION TIME

FIG.1A

| T_meas (ms) | N_TTI=1 FRAME Tre-confirm, GSM (ms) | N_TTI=2 FRAMES Tre-confirm, GSM (ms) | N_TTI=4 FRAMES Tre-confirm, GSM (ms) | N_TTI=8 FRAMES Tre-confirm, GSM (ms) |
|---|---|---|---|---|
| 80 | 2880 | 1600 | – | – |
| 160 | 6400 | 3200 | 2240 | 1600 |
| 240 | 17280 | 4800 | – | – |
| 320 | 14080 | 6400 | 4480 | 3200 |
| 480 | 22080 | 9600 | 6720 | 4800 |
| 640 | 26880 | 12800 | 10240 | 6400 |
| 960 | * | 17280 | 13440 | 9600 |
| 1280 | * | 33280 | 17920 | 12800 |
| 1920 | * | * | 26880 | 19200 |

NOTE * : THERE ARE NO PERFORMANCE REQUIREMENTS FOR THESE COMBINATIONS OF PARAMETERS BECAUSE THEY RESULT IN LONG RECONFIRMATION TIME

FIG.1B

| T_meas (ms) | N_TTI=1 FRAME T_identify, GSM (ms) | N_TTI=2 FRAMES T_identify, GSM (ms) | N_TTI=4 FRAMES T_identify, GSM (ms) | N_TTI=8 FRAMES T_identify, GSM (ms) |
|---|---|---|---|---|
| 80 | 2880 | 1280 | – | – |
| 160 | 7680 | 2880 | 1280 | 640 |
| 240 | 29760 | 5280 | – | – |
| 320 | 14080 | 6400 | 2560 | 1280 |
| 480 | 34560 | 12480 | 2880 | 1920 |
| 640 | 34560 | 12800 | 5120 | 2560 |
| 960 | * | 24960 | 5760 | 3840 |
| 1280 | * | 20480 | 10240 | 5120 |
| 1920 | * | 34560 | 15360 | 7680 |

NOTE * : THERE ARE NO PERFORMANCE REQUIREMENTS FOR THESE COMBINATIONS OF PARAMETERS BECAUSE THEY RESULT IN LONG IDENTIFICATION TIME

FIG.2A

| T_meas (ms) | N_TTI=1 FRAME T_re-confirm, GSM (ms) | N_TTI=2 FRAMES T_re-confirm, GSM (ms) | N_TTI=4 FRAMES T_re-confirm, GSM (ms) | N_TTI=8 FRAMES T_re-confirm, GSM (ms) |
|---|---|---|---|---|
| 80 | 2880 | 1600 | – | – |
| 160 | 6400 | 3200 | 2240 | 1600 |
| 240 | 17280 | 4800 | – | – |
| 320 | 14080 | 6400 | 4480 | 3200 |
| 480 | 22080 | 9600 | 6720 | 4800 |
| 640 | 26880 | 12800 | 10240 | 6400 |
| 960 | * | 17280 | 13440 | 9600 |
| 1280 | * | 33280 | 17920 | 12800 |
| 1920 | * | * | 26880 | 19200 |

NOTE * : THERE ARE NO PERFORMANCE REQUIREMENTS FOR THESE COMBINATIONS OF PARAMETERS BECAUSE THEY RESULT IN LONG RECONFIRMATION TIME

FIG.2B

5.2.6.1.2a Measurement rules for inter-frequency and inter-RAT cell reselection when absolute priorities are used The measurement rules below apply in IDLE, URA_PCH, CELL_PCH states. In CELL_FACH state the UE is required to perform measurements of inter-frequency and inter-RAT cells listed in system information according to requirements specified in [10]. UE specific priorities are not applied on any cell state.

If the UE has received absolute priority information for inter-frequency layers, the UE shall follow these rules:
- The UE shall perform measurements of inter-frequency layers with a priority higher than the priority of the current serving layer.

NOTE: The rate of these measurements may vary depending on whether Srxlev and Squal of the serving cell are above or below Spriorirysearch1 and Spriorirysearch2. This is specified in [10].

- When the UE in camped normally state, has only dedicated priorities other than for the current frequency, the UE shall consider the current frequency to be the lowest priority frequency (i.e. lower than the eight network configured values).

- For inter-frequency layers with a priority equal or lower than the priority of the current serving layer:
  - If SrxlevServingCell > Spriorirysearch1 AND SqualServingCell > Spriorirysearch2 the UE may choose not to perform measurements of inter-frequency layers of equal or lower priority.
  - If SrxlevServingCell <= Spriorirysearch1 OR SqualServingCell <=Spriorirysearch2 the UE shall perform measurements of inter-frequency layers of equal or lower priority.

- The UE shall not perform measurements of inter-frequency layers for which the UE has no absolute priority.

If the UE has received absolute priority information for inter-RAT layers, the UE shall follow these rules:
- The UE shall perform measurements of inter-RAT layers with a priority higher than the priority of the current serving cell.

NOTE: The rate of these measurements may vary depending on whether Srxlev and Squal of the serving cell are above or below Spriorirysearch1 and Spriorirysearch2. This is specified in [10].

- For inter-RAT layers with a priority lower than the priority of the current serving cell:
  - If SrxlevServingCell> Spriorirysearch1 AND SqualServingCell > Spriorirysearch2 the UE may choose not to perform measurements of inter-RAT layers lower priority.
  - If SrxlevServingCell <= Spriorirysearch1 OR SqualServingCell <=Spriorirysearch2 the UE shall perform measurements of inter-RAT layers of lower priority.

- The UE shall perform measurements according to subclause 5.2.6.1.1 for inter-RAT layers for which the UE has no absolute priority. For all inter-RAT layers belonging to one RAT, either the rules above or the rules in subclause 5.2.6.1.1 or 5.2.6.1.2 shall apply.

FIG.3

PRIORITY MEASUREMENT RULES FOR CHANNEL MEASUREMENT OCCASIONS

TECHNICAL FIELD

The exemplary and non-limiting embodiments of this invention relate generally to wireless communication systems, methods, devices and computer programs and, more specifically, relate to inter-frequency and inter-radio access technology measurements made by a user equipment.

BACKGROUND

The following abbreviations that may be found in the specification and/or the drawing figures are defined as follows:

| | |
|---|---|
| 3GPP | third generation partnership project |
| BSIC | base station identification code |
| DL | downlink |
| E-UTRAN | evolved UTRAN (LTE) |
| FACH | forward access channel |
| GERAN | GSM-enhanced data rates for global evolution (EDGE) |
| GSM | global system for mobile communications |
| HSPA | high speed packet access |
| LTE | long term evolution |
| RAT | radio access technology |
| TDD | time division duplex |
| UE | user equipment |
| UL | uplink |
| UTRAN | universal terrestrial radio access network |
| WCDMA | wideband code division multiple access |

The exemplary embodiments detailed herein are in the context of the WCDMA and HSPA (GSM) wireless systems to resolve problems in measuring inter-frequency and inter-RAT neighbor cells. These teachings are not limited only to those wireless systems but are more generally applicable; the examples merely illustrate specific implementation details relevant to those systems.

In the WCDMA/HSPA system the UE can make these inter-frequency and inter-RAT neighbor cell measurements when in the FACH state, which is when the UE is camped on a cell and has a signalling connection established with the network. The UE makes such measurements only during what is termed a measurement occasion. Currently, the inter-RAT measurement occasions are specified for GERAN only, but as E-UTRAN becomes more ubiquitous these neighbor cells are expected to be measured by the UE camped in the WCDMA/HSPA system also. A problem arises when increasing the number of measurement occasions to include E-UTRAN.

Generally, measurement occasions are infrequent and are shared equally between all the measurement types configured for the UE, so the effectiveness of these measurement gaps is quite poor. When E-UTRAN is introduced for the inter-RAT measurements the effectiveness may become even worse if the current measurement occasion concepts are simply extended to include E-UTRAN neighbors.

First, consider the current measurement occasion practice which is set forth at 3GPP TS 25.133. The measurement repetition $T_{meas}$ in milliseconds (ms) is determined by the following algorithm:

$$T_{meas} = [(N_{FDD} + N_{TDD} + N_{GSM}) \cdot N_{TTI} \cdot M\_REP \cdot 10];$$

where:
M_REP is the measurement occasion cycle length where K is given in Table 8.10A of 3GPP TS 25.133 (K is the FACH measurement occasion length coefficient, which is specified in 3GPP TS 25.331)

The FACH measurement occasion of $N_{TTI}$ frames will be repeated every $N_{TTI}$*M_REP frame. This means that the measurement time $T_{meas}$ increases uniformly for each RAT supported, which has a detrimental impact on inter-frequency and inter-RAT measurements and therefore UE mobility. Since currently only GERAN neighbor cells account for the inter-RAT measurements this has not yet become a problem in practice.

To quantify the impact of adding E-UTRAN cells to the inter-RAT measurements, consider a typical FACH configuration as follows: inter-frequency ($N_{FDD}$=1); inter-RAT (GERAN) ($N_{GSM}$=1), where K is 3 (MREP=8) and $N_{TTI}$=1. In this configuration, $T_{meas}$=(1+0+1)*1*8*10=160 ms.

In this scenario there is an inter-frequency measurement occasion every 160 ms, but since it takes about five measurement occasions to perform a search then there can be a search only every 800 ms. Also in this scenario a GERAN (inter-RAT) measurement occasion is also configured every 160 ms, which as seen at FIG. 1A yields a BSIC verification time of 7.68 seconds and at FIG. 1B a BSIC refresh time of 6.4 seconds.

Now extend this same measurement occasion protocol to include the possibility of E-UTRAN neighbor cells. In this straightforward extension the measurement time $T_{meas}$ in milliseconds is then defined as:

$$T_{meas} = [(N_{FDD} + N_{TDD} + N_{GSM} + N_{EUTRA}) \cdot N_{TTI} \cdot M\_REP \cdot 10]$$

Using the same FACH configuration as above then $T_{meas}$=(1+0+1+1)*1*8*10=240 ms.

There is therefore an inter-RAT measurement occasion for E-UTRAN every 240 ms, but in this case it takes as few as one measurement occasion to perform an E-UTRAN search so there is a search every 240 ms. This also provides an inter-frequency measurement occasion every 240 ms, and since it still will take about five measurement occasions to perform a search then there can be an inter-frequency search only every 1200 ms.

The inter-frequency measurements would be impacted by including E-UTRAN because the number of cell-FACH measurement occasions is reduced by a third. This also results in a GERAN measurement every 240 ms, which results in a BSIC verification time of 29.76 seconds as seen at FIG. 2A, and a BSIC refresh time of 17.28 seconds as seen at FIG. 2B. This is seen to be too long of a time for GERAN measurements. The teachings below address this problem, but as indicated have utility beyond only the GSM/GERAN/E-UTRAN systems which are used only for specific illustration of the principles.

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: determine signal strength of a serving cell; and choose, based on the determined signal strength, whether to utilize a measurement occasion for a lower priority neighbor cell search or for a higher priority neighbor cell search. In this embodiment the lower priority neighbor cell search is for maintaining wireless connectivity and the higher priority neighbor cell search is for accessing enhanced wireless service as compared to the serving cell.

In a second exemplary embodiment of the invention there is a method comprising: determining signal strength of a serving cell; and choosing, based on the determined signal strength, whether to utilize a measurement occasion for a lower priority neighbor cell search or for a higher priority neighbor cell search. In this embodiment the lower priority neighbor cell search is for maintaining wireless connectivity and the higher priority neighbor cell search is for accessing enhanced wireless service as compared to the serving cell.

In a third exemplary embodiment of the invention there is a computer readable memory storing a computer program, in which the computer program comprises: code for determining signal strength of a serving cell; and code for choosing, based on the determined signal strength, whether to utilize a measurement occasion for a lower priority neighbor cell search or for a higher priority neighbor cell search. In this embodiment the lower priority neighbor cell search is for maintaining wireless connectivity and the higher priority neighbor cell search is for accessing enhanced wireless service as compared to the serving cell.

By example, the measurement occasion in any of the above exemplary embodiments may be a cell-FACH measurement occasion. These and other embodiments and aspects are detailed below with particularity.

BRIEF DESCRIPTION OF THE DRAWINGS

FIG. 1a is a table showing times for identifying a GSM base station for different measurement occasion times governed by measurement repetition $T_{meas}$ calculated to include measuring inter-frequency and GSM.

FIG. 1b is a table showing times for verifying a GSM base station for different measurement occasion times governed by measurement repetition $T_{meas}$ calculated to include measuring inter-frequency and GSM.

FIG. 2a is a table similar to FIG. 1a but extended to include searching for an E-UTRAN neighbor cell.

FIG. 2b is a table similar to FIG. 1b but extended to include searching for an E-UTRAN neighbor cell.

FIG. 3 is a reproduction of section 5.2.6.1.2a of 3GPP TS 25.304 V9.3.0 (2010-09)

DETAILED DESCRIPTION

Exemplary embodiments of these teachings address the above problem by enabling a UE to dynamically switch between coverage and service based measurements, thereby utilizing its cell-FACH measurement occasions more effec- tively. As quantified above, sharing the cell-FACH measurement occasions limits the UE's mobility while in the cell-FACH state and introducing E-UTRAN to these measurement occasions will more severely limit that mobility. As will be seen below, these teachings enable the UE to maximize the effectiveness of the limited time available. In one aspect of these teachings the relative importance of the different types of measurements, whether the measurements are for coverage or for service for example, will vary as the strength of the serving cell changes. For example, coverage is important when the serving cell is weak to better assure an alternate cell for the UE in case signal strength from its serving cell continues to deteriorate. Service, such as looking for hot spot coverage to enable additional or enhanced mobile services beyond simply cellular call coverage, is more important when signal strength from the serving cell is stronger and basic cellular coverage from the serving cell is not reasonably in doubt in the near term.

With these general principles in mind, now consider a priority re-selection algorithm in the E-UTRAN system. By this algorithm the network can prioritize either a frequency layer or a RAT over another. This means that the available measurement occasions can be used more efficiently depending on the strength of the serving cell. When E-UTRAN is supported the UE will perform measurements based on the Release 8 measurement rules specified in 3GPP TS 25.304, reproduced at FIG. 3. The Release 99 mechanism for applying measurement occasions based on a fixed measurement purpose, measuring either inter-frequencies or a RAT, can therefore be improved.

The new Release 8 priority definitions means that the measurement occasion gaps can be used for different purposes based on the priorities identified by the network. These can be applied based on the variable Sprioritysearch1 or Sprioritysearch2. This mechanism for overriding the Release 99 measurement purpose can be applied to both the Release 99 inter-frequency and inter-RAT measurement occasions or just inter-RAT measurement occasions, at the network's choosing.

Figure 4:
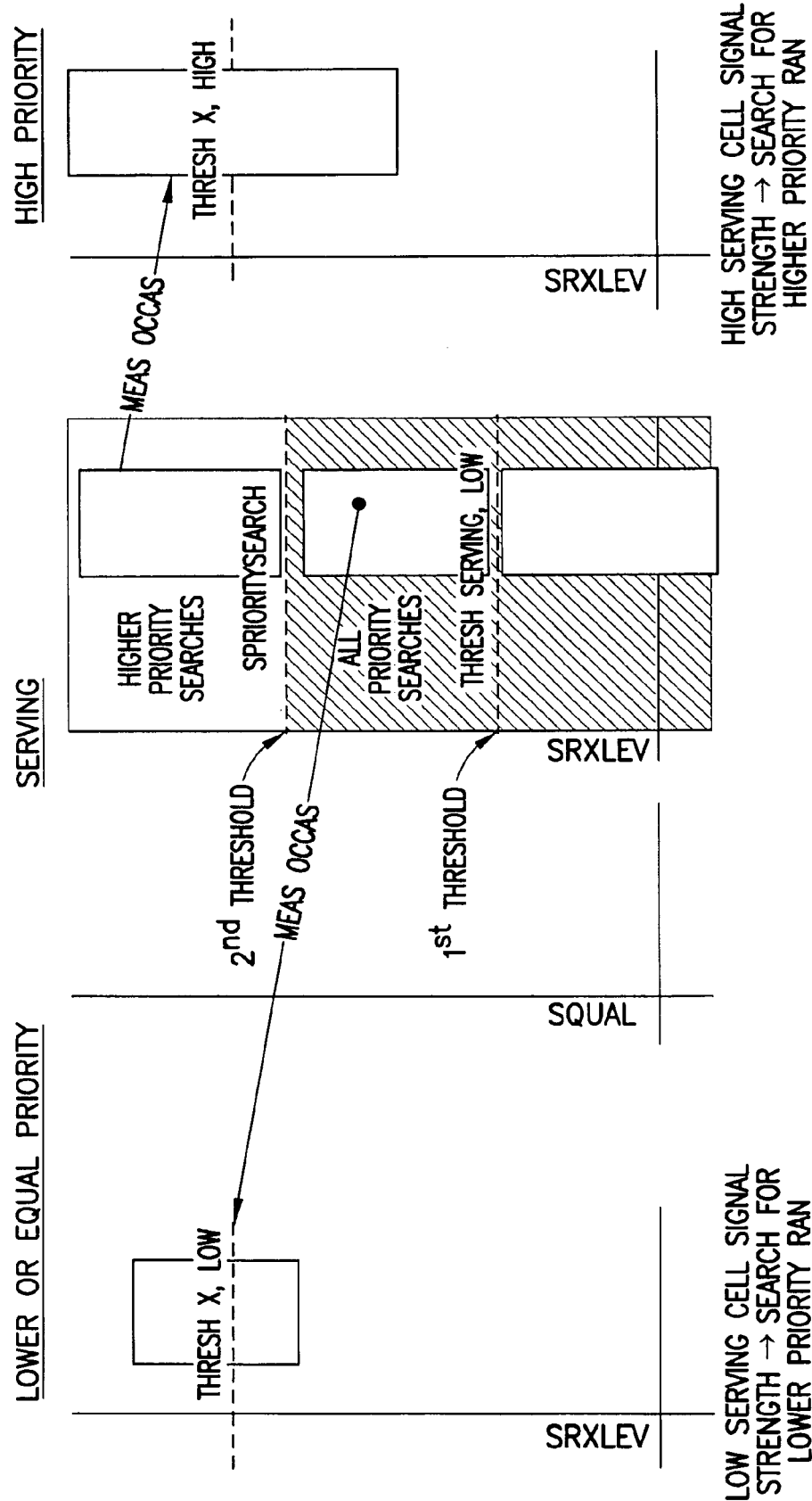
FIG. 4 is a diagram showing dynamic selection between high priority and low priority searching for and measuring of neighbor cells based on signal strength received from a user equipment's serving cell according to an exemplary embodiment of the invention.

FIG. 4 illustrates conceptually an exemplary embodiment of the invention, divided into three areas of serving cell signal strength. When the serving cell strength is strong and in the higher priority search region, above a second threshold which corresponds for example to the "Sprioritysearch" parameter as shown at FIG. 4, the UE can override the Release 99 measurement purposes and use the measurement occasions to detect high priority RATs and/or inter-frequencies. In the specific examples below the higher priority is the E-UTRAN system, but in another exemplary embodiment can be a UTRAN inter-frequency layer. So a lower priority neighbor cell search better aids the UE in maintaining wireless connectivity, while a higher priority neighbor cell search is for accessing enhanced wireless service as compared to the serving cell, such as for example increased data rates E-UTRAN offers over WCDMA/HSPA. This connectivity/service priority distinction is true whether the searches are inter-frequency or inter-RAT searches, Further at FIG. 4, when the serving cell signal strength drops below that second threshold to lie within the "ALL priority" search region shown there, the UE can chose to schedule the measurement occasions based on either GERAN or E-UTRAN based on their determined signal strengths, or prioritize the lower priority RAT which in this case is GERAN. When the serving cell signal strength drops further to fall below a first threshold shown in FIG. 4 as "Thresh Serving low", coverage becomes a more pressing concern and so the UE utilizes its measurement occasions to search for inter-frequency and GERAN neighbor cells according to conventional Release 99 measurement occasion purposes.

Figure 5A:
FIGS. 5a-e illustrate various choices made for a series of seven measurement occasions based on the signal strength received from a UE's serving cell according to exemplary embodiments of the invention.

FIGS. 5a-e illustrate use of the UE's measurement occasions in various instances according to an exemplary embodiment of the invention, in which each figure illustrates seven consecutive measurement occasions for a UE. FIG. 5a illustrates the UE's conventional (Release 99 measurement purpose is fixed) use of them; each alternate measurement occasion is used for an inter-frequency search and measurement of neighbor cells (the FDD blocks), and for an inter-RAT search and measurement of neighbor cells operating according to GERAN (the GERAN blocks). The search pattern of FIG. 5a might also result from the UE's serving cell signal strength lying between the first and second thresholds of FIG. 4 (so the UE can choose which inter-RAT neighbor to measure).

Figure 5B:
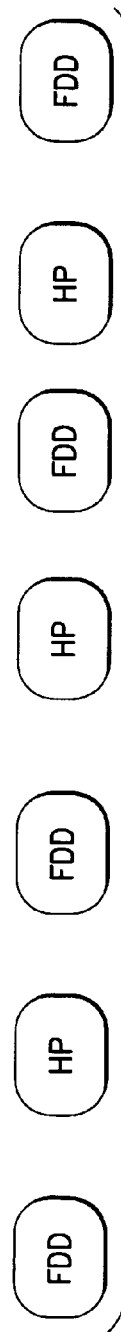

The search pattern of FIG. 5b represents the case in which the UE's serving cell signal strength is very good, above the second threshold of FIG. 4 which means coverage by the serving cell is assured and the measurement occasions are used to search for better/enhanced coverage. At FIG. 5b the UE uses its inter-RAT measurement occasions to search and measure neighbor E-UTRAN cells and uses its inter-frequency measurement occasions to search and measure neighbor cells on a different frequency layer than its serving cell. The same pattern of FIG. 5b may also result from the serving cell signal strength lying between the first and second thresholds as in FIG. 5a.

Figure 5C:
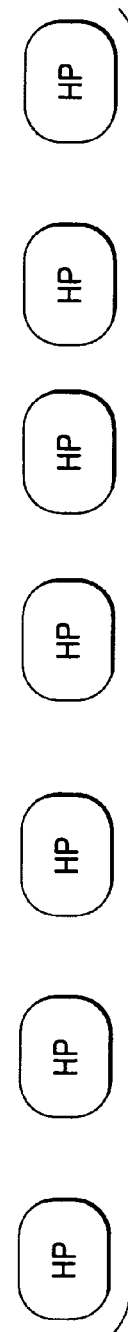

FIG. 5c also considers the case in which the serving cell signal strength is above the higher second threshold, but in this example the UE utilizes both its inter-frequency FDD measurement occasions and its inter-RAT measurement occasions for high priority searching, which in this case is for E-UTRAN neighbor cells.

Figure 5D:
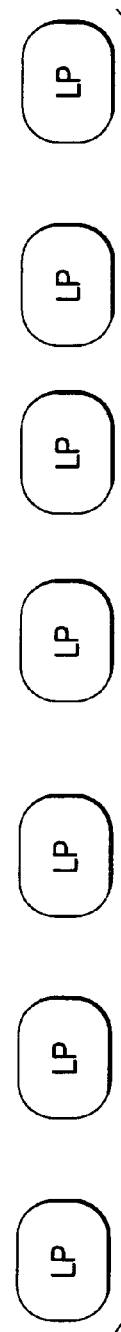
Figure 5E:

FIG. 5d represents the case in which the signal strength from the UE's serving cell is below the lower first threshold of FIG. 4, in which case all the UE's measurement occasions are low priority searches to better assure that basic wireless coverage is maintained. FIG. 5e shows specifics for the low priority search occasions of FIG. 5d, which in this case is the same as FIG. 5a and the conventional alternating between inter-frequency searching and inter-RAT searching for neighbors operating in the GERAN system.

In another embodiment there is only one threshold so that the higher priority searches are done when the signal strength of the UE's serving cell is higher than that threshold, and the lower priority searches are done when that signal strength is lower than the threshold.

Exemplary embodiments of these teachings exhibit the technical effect of enabling the UE to use GSM Release 99 measurement occasions rules in an algorithm which allows the UE to also search for another higher priority RAT and/or frequency. Conventionally, while a UE is in the CELL FACH state it has no mobility to an E-UTRA neighbor cell and so the CELL FACH UE will stay within the UTRA system (GSM and GERAN in these examples) and will not be able to re-select to a neighbor which offers the higher data rates that E-UTRA or some other higher priority layers might offer. Performance of re-selections to UTRA and GERAN frequencies should not be inhibited because the purpose for which the measurement occasion is used switches back and forth, based on the strength of the UE's serving cell. Another technical effect is that there is no change on the network side and so these solutions are quite straightforward to implement despite the highly structured nature of wireless cellular communications.

Figure 6:
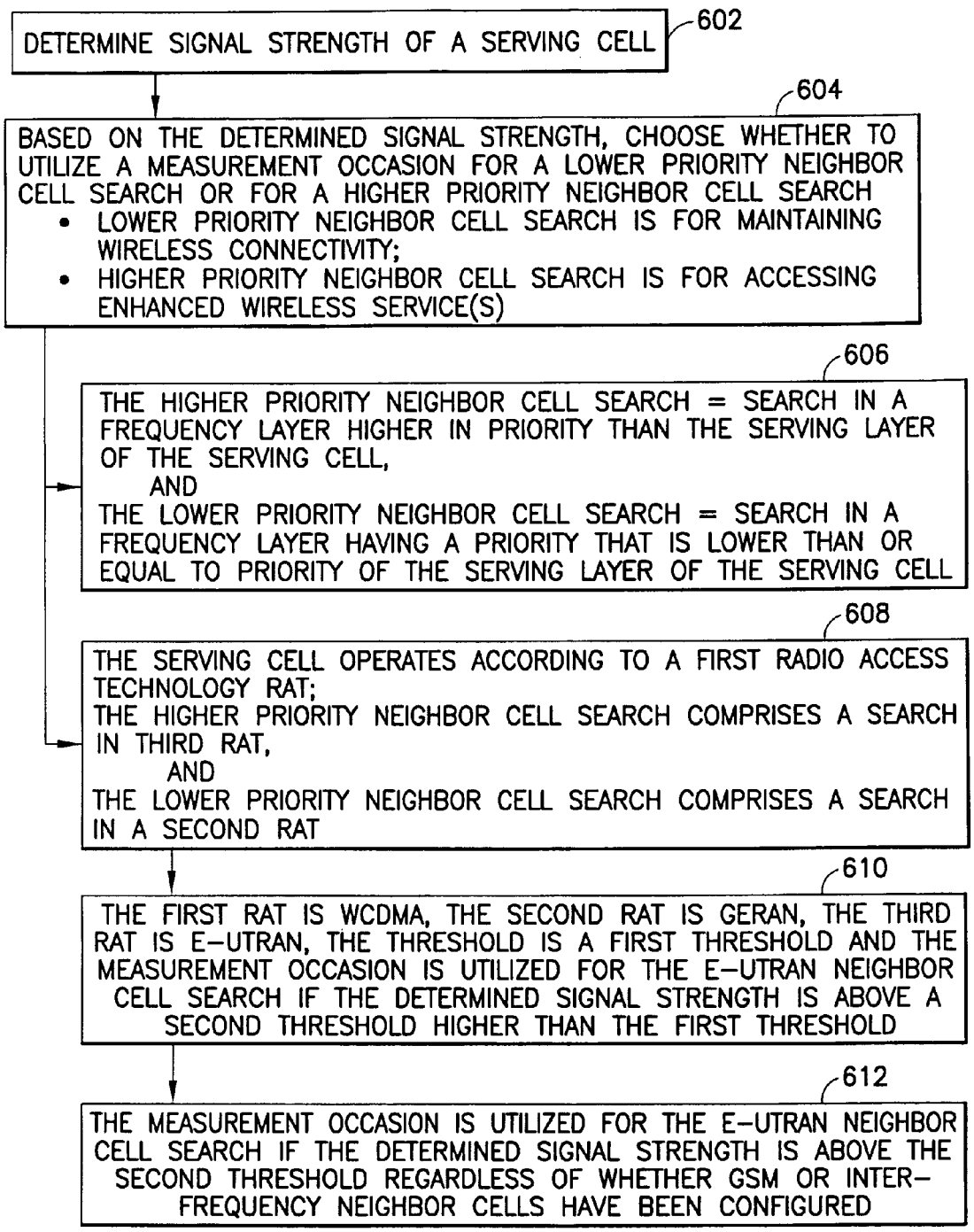
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram which describes an exemplary embodiment of the invention from the perspective of the UE. FIG. 6 may be considered to illustrate the operation of a method, and a result of execution of a computer program stored in a computer readable memory, and a specific manner in which components of an electronic device are configured to cause that electronic device to operate. The various blocks shown in FIG. 6 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

At block 602 the signal strength of a serving cell is determined. In an embodiment that serving cell is operating according to a $1^{St}$ radio technology, which in the above examples is the WCDMA or HSPA. At block 604, based on that determined signal strength a selection or choice is made whether to utilize a measurement occasion for a lower priority neighbor cell search or for a higher priority neighbor cell search. The lower priority neighbor cell search is for maintaining wireless connectivity and the higher priority neighbor cell search is for accessing enhanced wireless service as compared to the serving cell. In a specific embodiment, the measurement occasion of block 604 is a cell-FACH measurement occasion.

The remainder of FIG. 6 illustrates more specific implementations for blocks 602 and 604. Block 606 refers to the inter-frequency search, so the higher priority neighbor cell search of block 604 is at block 606 a search in a frequency layer higher in priority than the serving layer of the serving cell. Similarly, the lower priority neighbor cell search of block 604 is at block 606 a search in a frequency layer having a priority that is lower than or equal to priority of the serving layer of the serving cell.

Block 608 refers to the inter-RAT search, which is generally stated there as the serving cell operating according to a first radio access technology RAT, the higher priority neighbor cell search of block 604 is at block 608 a search in a third RAT, and the lower priority neighbor cell search of block 604 is at block 608 a search in a second RAT.

Block 610 details the specific RATs from the above examples and also the second threshold from FIG. 4: the first RAT is WCDMA, the second RAT is GERAN, the third RAT is E-UTRAN, the threshold is a first threshold and the measurement occasion is utilized for the E-UTRAN neighbor cell search if the determined signal strength is above a second threshold higher than the first threshold.

Block 612 refers to the specific inter-RAT example of FIG. 5c in which the measurement occasion is utilized for the E-UTRAN neighbor cell search (higher priority inter-RAT search) if the determined signal strength is above the second threshold regardless of whether the measurement occasion is an inter-RAT measurement occasion or an inter-frequency measurement occasion. Conventionally the different measurement occasions themselves are not specifically allocated for inter-frequency or inter-RAT purposes; 3GPP TS 25.133 only states that they are to be shared equally by the modes which the UE has capability for and that are in the monitored set signaled by the network. It then follows that for a UTRAN-specific implementation, the above concept may be more precisely stated as seen at block 312: the cell-FACH measurement occasion is utilized only for the E-UTRAN neighbor cell search regardless of whether GSM (GERAN) or inter-frequency neighbour cells have been configured for the UE which is operating under the serving cell noted at block 602.

In a specific embodiment, FIG. 6 may be considered to represent actions of a modem which may be apart from or disposed within the above UE.

Embodiments of the invention may be implemented as an apparatus which has determining means and choosing means. The determining means is for determining signal strength of a serving cell as in block 602 of FIG. 6, and may by example be a measuring means. Specific embodiments of such determining/measuring means may be for example a radio receiver and/or a processor. The choosing means is for choosing whether to utilize a (e.g., cell-FACH) measurement occasion for a lower priority neighbor cell search or for a higher priority neighbor cell search, and as shown at block 604 of FIG. 6, this choosing means bases its choice on the signal strength determined by the determining means. Specific embodiments of such choosing means may be for example at least one processor in conjunctions with computer instructions such as an algorithm or priority measurement rules stored on a computer readable memory. As above, the lower priority neighbor cell search is for maintaining wireless connectivity and the higher priority neighbor cell search is for accessing enhanced wireless service as compared to the serving cell.

Figure 7:
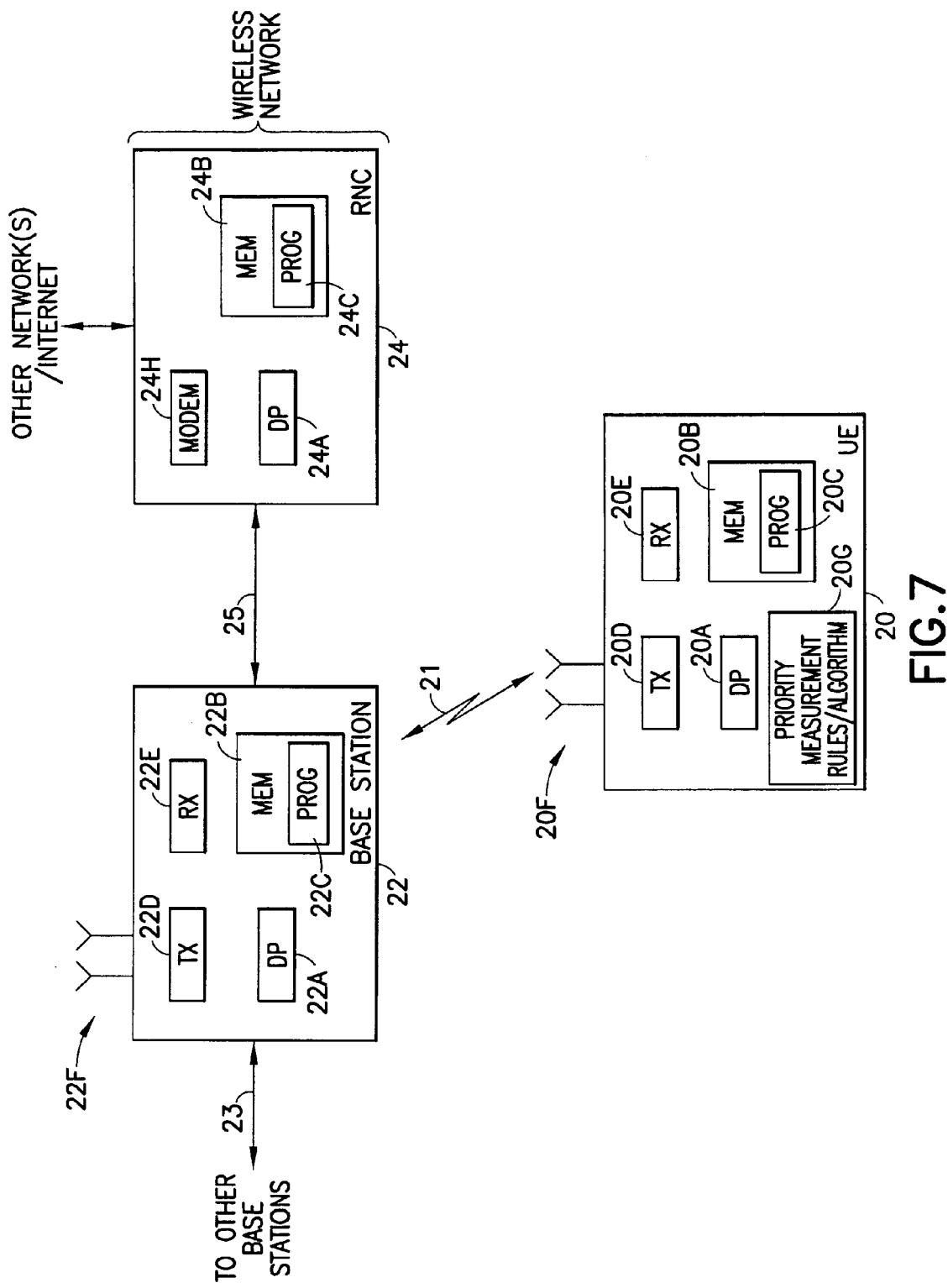
FIG. 7 is a simplified block diagram of the UE in communication with a wireless network illustrated as a base station and a RNC, which are exemplary electronic devices suitable for use in practicing the exemplary embodiments of this invention.

Reference is now made to FIG. 7 for illustrating a simplified block diagram of various electronic devices and apparatus that are suitable for use in practicing the exemplary embodiments of this invention. In FIG. 7 a wireless network (base station 22 and RNC 24) is adapted for communication over a wireless link 21 with an apparatus, such as a mobile terminal or UE 20, via a network access node such as a base station/NodeB 22 or relay station. The network may include a radio network controller RNC 24, which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the base station 22 via one or more antennas 20F. Also stored in the MEM 20B at reference number 200 is the priority measurement rules, more particularly an algorithm for choosing, based on signals strength of the serving cell 22, whether to use a next measurement occasion for a high priority search (E-UTRAN in the inter-RAT examples) or a low priority search (GERAN in the inter-RAT examples) as detailed above.

The base station 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path 25 coupling the base station 22 with the RNC 24, and another data and/or control path 23 coupling the base station 22 to other base stations/node Bs/access nodes.

Similarly, the RNC 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the base station 22 via the data/control path 25. While not particularly illustrated for the UE 20 or base station 22, those devices are also assumed to include as part of their wireless communicating means a modem which may be inbuilt on an RF front end chip within those devices 20, 22 and which also carries the TX 20D/22D and the RX 20E/22E.

At least one of the PROGs 20C/20G in the UE 20 is assumed to include program instructions that, when executed by the associated DP 20A, enable the device to operate in accordance with the exemplary embodiments of this invention, as detailed above. The base station 22 may also have software stored in its MEM 22B to implement certain aspects of these teachings as detailed above, s as to know or better anticipate how the UE 20 will utilize its measurement occasions. In this regard the exemplary embodiments of this invention may be implemented at least in part by computer software stored on the MEM 20B, 22B which is executable by the DP 20A of the UE 20 and/or by the DP 22A of the base station 22, or by hardware, or by a combination of tangibly stored software and hardware (and tangibly stored firmware). Electronic devices implementing these aspects of the invention need not be the entire UE 20 or base station 22, but exemplary embodiments may be implemented by one or more components of same such as the above described tangibly stored software, hardware, firmware and DP, modem, system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A and 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the UTRAN Release 99 system, it should be appreciated that the exemplary embodiments of this invention are not limited for use with only this one particular type of wireless communication system, and that they may be used to advantage in other wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
   circuitry configured to:
   determine signal strength of a serving cell; and choose, based on the determined signal strength, a lower priority neighbor cell search or a higher priority neighbor cell search for a next periodic cell forward access channel (FACH) measurement occasion, while overriding a predetermined measurement occasion for at least the lower priority neighbor cell search when the higher priority neighbor cell search is chosen in the next periodic cell FACH measurement occasion, in which the lower priority neighbor cell search is for maintaining wireless connectivity by finding an alternate cell for cellular voice call coverage in case the signal strength of the service cell deteriorates beyond the determined signal strength, and the higher priority neighbor cell search is for accessing enhanced wireless service that provides higher data rates than cellular voice call coverage that is currently provided by the serving cell;

wherein:

the serving cell operates according to a first radio access technology (RAT) which is WCDMA;

the higher priority neighbor cell search comprises a search in a third RAT which is E-UTRAN or in a frequency layer higher in priority than a serving layer of the serving cell;

the lower priority neighbor cell search comprises a search in a second RAT which is GERAN or in a frequency layer having a priority that is lower than or equal to priority of the serving layer of the serving cell; and the measurement occasion is utilized for the lower priority neighbor cell search when the determined signal strength is below a threshold.

2. The apparatus according to claim 1, in which the threshold is a first threshold and the measurement occasion is utilized for the E-UTRAN neighbor cell search if the determined signal strength is above a second threshold higher than the first threshold.

3. The apparatus according to claim 2, in which the measurement occasion is utilized only for the E-UTRAN neighbor cell search if the determined signal strength is above the second threshold regardless of whether GERAN or inter-frequency neighbor cells have been configured.

4. The apparatus according to claim 1, in which the apparatus comprises a user equipment operating in a forward access channel state of a WCDMA system.

5. The apparatus according to claim 1, in which the apparatus comprises a modem.

6. The apparatus according to claim 1, wherein the periodic FACH measurement occasions are spaced at 80 ms or an integer multiple thereof.

7. A method implemented by an apparatus, comprising:

determining, by circuitry of the apparatus, signal strength of a serving cell; and choosing by the circuitry, based on the determined signal strength, a lower priority neighbor cell search or a higher priority neighbor cell search for a next periodic cell forward access channel (FACH) measurement occasion, while overriding a predetermined measurement occasion for at least the lower priority neighbor cell search when the higher priority neighbor cell search is chosen in the next periodic cell FACH measurement occasion, in which the lower priority neighbor cell search is for maintaining wireless connectivity by finding an alternate cell for cellular voice call coverage in case the signal strength of the serving cell deteriorates beyond the determined signal strength, and the higher priority neighbor cell search is for accessing enhanced wireless service that provides higher data rates than cellular voice call coverage that is currently provided by the serving cell;

wherein:

the serving cell operates according to a first radio access technology (RAT) which is WCDMA;

the higher priority neighbor cell search comprises a search in a third RAT which is E-UTRAN or in a frequency layer higher in priority than a serving layer of the serving cell;

the lower priority neighbor cell search comprises a search in a second RAT which is GERAN or in a frequency layer having a priority that is lower than or equal to priority of the serving layer of the serving cell; and the measurement occasion is utilized for the lower priority neighbor cell search when the determined signal strength is below a threshold.

8. The method according to claim 7, in which the threshold is a first threshold and the measurement occasion is utilized for the E-UTRAN neighbor cell search when the determined signal strength is above a second threshold higher than the first threshold.

9. The method according to claim 8, in which the measurement occasion is utilized only for the E-UTRAN neighbor cell search when the determined signal strength is above the second threshold regardless of whether GERAN or inter-frequency neighbor cells have been configured.

10. The method according to claim 7, in which the method is executed by a user equipment operating in a forward access channel state of a WCDMA system.

11. The method according to claim 7, in which the method is executed by a modem.

12. The method according to claim 7, wherein the periodic FACH measurement occasions are spaced at 80 ms or an integer multiple thereof.

13. A non-transitory computer readable memory comprising computer executable instructions, wherein the instructions, when executed by an apparatus having circuitry, cause the apparatus to perform a method comprising:

determining signal strength of a serving cell; and choosing, based on the determined signal strength, a lower priority neighbor cell search or a higher priority neighbor cell search for a next periodic cell forward access channel (FACH) measurement occasion, while overriding a predetermined measurement occasion for at least the lower priority neighbor cell search when the higher priority neighbor cell search is chosen in the next periodic cell FACH measurement occasion, in which the lower priority neighbor cell search is for maintaining wireless connectivity by finding an alternate cell for cellular voice call coverage in case the signal strength of the serving cell deteriorates beyond the determined signal strength, and the higher priority neighbor cell search is for accessing enhanced wireless service that provides higher data rates than cellular voice call coverage that is currently provided by the serving cell;

wherein:

the serving cell operates according to a first radio access technology (RAT) which is WCDMA;

the higher priority neighbor cell search comprises a search in a third RAT which is E-UTRAN or in a frequency layer higher in priority than a serving layer of the serving cell;

the lower priority neighbor cell search comprises a search in a second RAT which is GERAN or in a frequency layer having a priority that is lower than or equal to priority of the serving layer of the serving cell; and the measurement occasion is utilized for the lower priority neighbor cell search when the determined signal strength is below a threshold.

14. The non-transitory computer readable memory according to claim 13, in which the threshold is a first threshold and the measurement occasion is utilized for the E-UTRAN neighbor cell search when the determined signal strength is above a second threshold higher than the first threshold.

15. The non-transitory computer readable memory according to claim 14, in which the measurement occasion is utilized only for the E-UTRAN neighbor cell search regardless of whether GERAN or inter-frequency neighbor cells have been configured.

16. The non-transitory computer readable memory according to claim 13, wherein the periodic FACH measurement occasions are spaced at 80 ms or an integer multiple thereof.

* * * * *